United States Patent
Harris et al.

[11] Patent Number: 6,004,037
[45] Date of Patent: Dec. 21, 1999

[54] BEARING ASSEMBLY WITH SPHERICAL BEARING SURFACES

[75] Inventors: Bernard Harris, Northbrook; Dennis E. Bozych, Downers Grove; Jeffrey R. Scholbe, Lisle, all of Ill.

[73] Assignee: Rexnord Corporation, Milwaukee, Wis.

[21] Appl. No.: 09/090,115

[22] Filed: Jun. 4, 1998

[51] Int. Cl.[6] ................................................. F16C 23/04
[52] U.S. Cl. .......................................... 384/206; 384/192
[58] Field of Search ................................. 384/192, 206, 384/208, 209, 210, 211, 213

[56] References Cited

U.S. PATENT DOCUMENTS

| | | |
|---|---|---|
| 3,700,295 | 10/1972 | Butzow et al. |
| 3,974,009 | 8/1976 | Butzow et al. ............................ 156/84 |
| 5,265,965 | 11/1993 | Harris et al. ............................. 384/208 |
| 5,288,354 | 2/1994 | Harris et al. ............................. 156/154 |
| 5,364,191 | 11/1994 | Gruber ................................. 384/206 X |
| 5,463,811 | 11/1995 | Aureli et al. ......................... 384/208 X |
| 5,725,315 | 3/1998 | Pace ..................................... 384/209 X |

FOREIGN PATENT DOCUMENTS

| | | | |
|---|---|---|---|
| 779419 | 7/1957 | United Kingdom | 384/213 |
| 1169433 | 11/1969 | United Kingdom | 384/206 |

*Primary Examiner*—Thomas R. Hannon

[57] ABSTRACT

A bearing assembly comprising an outer non-rotating sub-assembly including an outer housing including a cylindrical bore, and an outer bearing including an outer cylindrical surface engaging the cylindrical bore of the outer housing, and a bore defined by a spherical inwardly facing bearing surface, and an inner rotating sub-assembly including an inner bearing including an outer surface defined by a spherical outwardly facing bearing surface engaging the inwardly facing bearing surface of the outer bearing, and an internal cylindrical bore adapted to receive a rotating member.

13 Claims, 2 Drawing Sheets

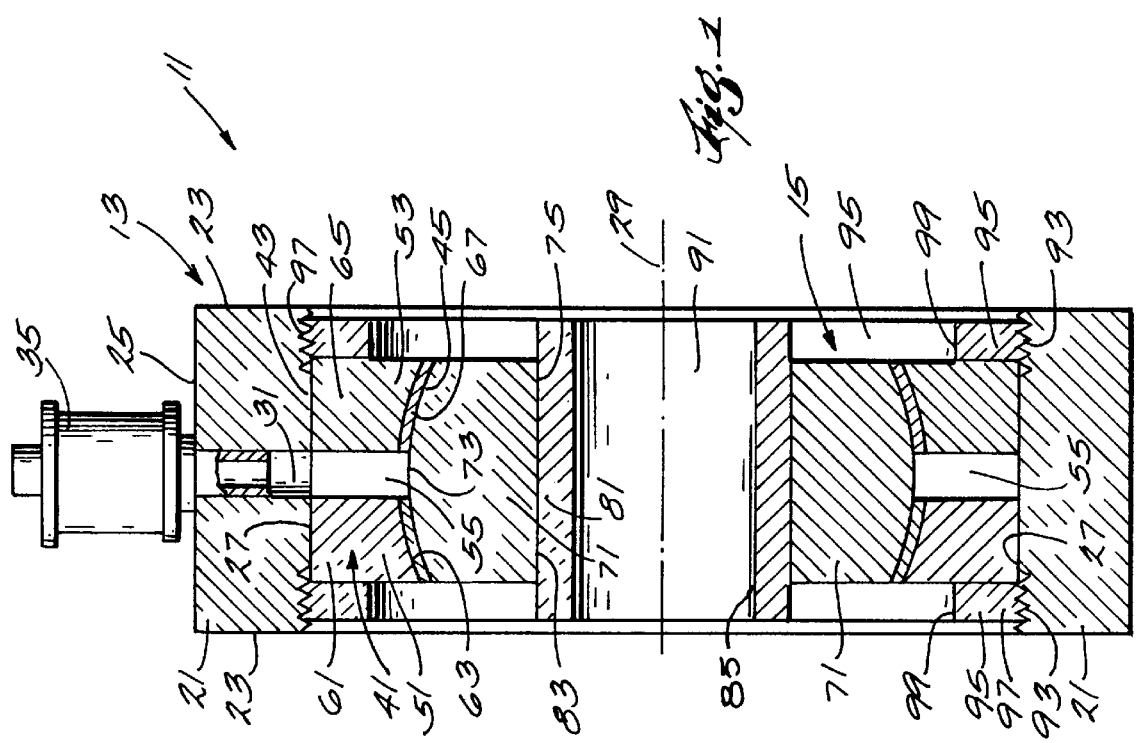

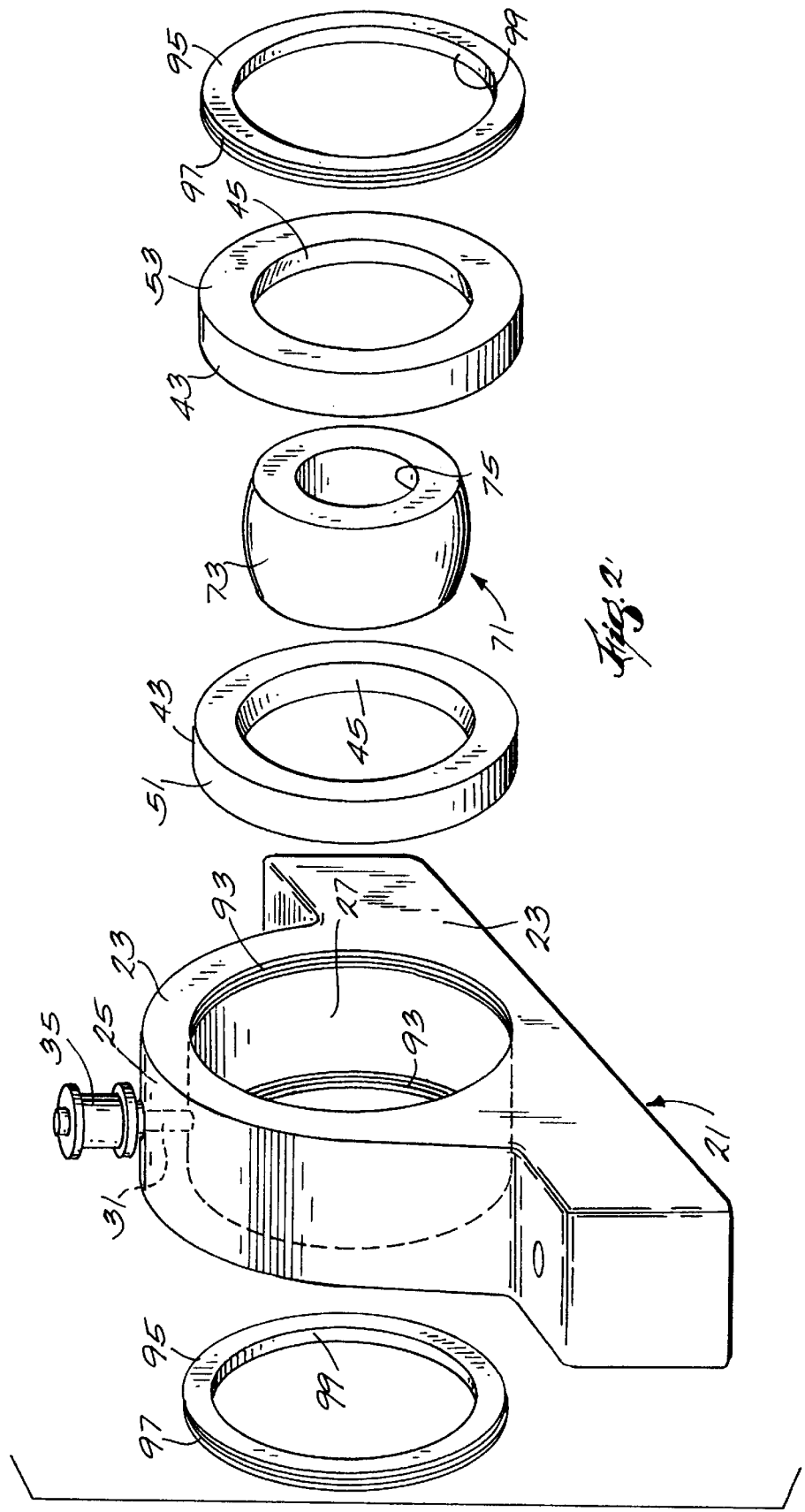

BEARING ASSEMBLY WITH SPHERICAL BEARING SURFACES

BACKGROUND OF THE INVENTION

The invention relates generally to composite journal bearings, and, more particularly, to an improved composite ball and socket journal bearing assembly.

Attention is directed to prior U.S. Pat. No. 5,265,965, issued Nov. 30, 1993, which is incorporated herein by reference. Attention is also directed to U.S. Pat. Nos. 3,700, 295, issued Oct. 24, 1972, and 3,974,009, issued Aug. 10, 1976. Attention is further directed to U.S. Pat. No. 5,288,354 issued Feb. 22, 1994, and incorporated herein by reference.

SUMMARY OF THE INVENTION

The invention provides a bearing assembly comprising an outer non-rotating sub-assembly including an outer housing having a cylindrical bore, and an outer bearing including an outer cylindrical surface engaging the cylindrical bore of the outer housing, an outer part fabricated of filament wound fiberglass and epoxy resin matrix, and an inner bearing part fabricated of woven PTFE fabric and including a spherical inwardly facing bearing surface. The bearing assembly also includes an inner movable sub-assembly including an inner bearing having an outer surface defined by a spherical outwardly facing bearing surface engaging the inwardly facing bearing surface of the outer bearing, and an internal cylindrical bore adapted to receive a movable member.

The invention also provides a bearing assembly comprising an outer non-rotating sub-assembly including an outer housing having a cylindrical bore, and an outer bearing including an outer cylindrical surface engaging the cylindrical bore of the outer housing, an outer part fabricated of filament wound fiberglass and epoxy resin matrix, and an inner bearing part fabricated of woven PTFE fabric and including a spherical inwardly facing bearing surface. The bearing assembly also includes an inner rotating sub-assembly including an inner bearing having an outer surface defined by a spherical outwardly facing bearing surface engaging the inwardly facing bearing surface of the outer bearing, and cylindrical bore, and a sleeve including a cylindrical outer surface received in the internal bore of the inner bearing, and an internal bore adapted to receive a rotating member to be fixed thereto for common rotation therewith.

The invention also provides a bearing assembly comprising an outer non-rotating sub-assembly including a pillow block housing including an external surface, a cylindrical bore having an axis, and first and second threaded ends, and a lubrication conduit communicating between the external surface and cylindrical bore, an outer bearing including a first bearing segment including a first cylindrical outer surface engaging the cylindrical bore of the pillow block housing, an outer part fabricated of filament wound fiberglass and epoxy resin matrix, and an inner bearing part fabricated of woven PTFE fabric and including a first inwardly facing spherical bearing surface, and a second bearing segment located in axially spaced relation to the first bearing segment to define therebetween a space communicating with the lubrication conduit in the pillow block housing and including a second cylindrical outer surface of the outer bearing engaging the cylindrical bore of the pillow block housing, an outer part fabricated of filament wound fiberglass and epoxy resin matrix, and an inner bearing part fabricated of woven PTFE fabric and including a second inwardly facing spherical bearing surface, and first and second annular covers respectively threadedly engaged with the first and second threaded ends of the cylindrical bore of the pillow block housing and in positions to close the cylindrical bore of the pillow block housing and to prevent axial movement of the outer bearing relative to the pillow block housing, and an inner rotating sub-assembly including an inner bearing including an outer surface defined by a spherical outwardly facing bearing surface engaging the inwardly facing bearing surfaces of the first and second segments of the outer bearing, and an internal cylindrical bore, and a sleeve including a cylindrical outer surface received in the internal bore of the inner bearing, and an internal bore adapted to receive a rotating member to be fixed thereto for common rotation therewith.

Other features and advantages of the invention will become apparent to those skilled in the art upon review of the following detailed description, claims and drawings.

DESCRIPTION OF THE DRAWINGS

FIG. 1 is a sectional view of a bearing assembly incorporating various features of the invention.

FIG. 2 is an exploded perspective view of a portion of the bearing assembly shown in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is a bearing assembly 11 comprising an outer non-rotating sub-assembly 13 and an inner rotating sub-assembly 15.

The outer non-rotating sub-assembly 13 includes an outer housing which, (while other constructions can be employed) in the disclosed construction, is in the form of a pillow block housing 21 including an external surface having spaced side surface portions 23, a generally semi-cylindrical outer surface portion 25 extending between the side surface portions 23, and a cylindrical bore 27 having an axis 29 and extending between the side surface portions 23.

The pillow block housing 21 also includes a lubrication conduit 31 communicating with the cylindrical bore 27, extending to the semi-cylindrical outer surface portion 25 of the external surface, and communicating with a suitable lubrication source 35. The pillow block housing 21 can be formed in any suitable way from any suitable material.

The outer non-rotating sub-assembly 13 also includes an outer bearing 41 which is located in the cylindrical bore 27 in the pillow block housing 21 and which includes an outer cylindrical surface 43 engaging the cylindrical bore 27 of the pillow block housing 21, and a bore defined by an inwardly facing, spherically shaped, bearing surface 45.

While other constructions can be employed, in the disclosed construction, the outer bearing 41 comprises first and second bearing segments 51 and 53 which are axially spaced from each other to define therebetween a space 55 which communicates with the lubrication conduit 31. The first bearing segment 51 includes an outer part or portion 61 providing a first portion of the cylindrical outer surface 43 of the outer bearing 41, and an inner part or portion 63 providing a first portion of the spherical inwardly facing, spherically shaped, bearing surface 45 of the outer bearing 41. The second bearing segment 53 includes an outer part or portion 65 providing a second portion of the cylindrical outer surface of the outer bearing, and an inner part or portion 67 providing a second portion of the inwardly facing, spherically shaped, bearing surface 45 of the outer bearing 41. The first and second bearing segments 51 and 53 are preferably of equal axial dimension between the opposing radial surfaces thereof.

While other constructions can be employed, in the disclosed construction, the inner portions 63 and 67, including the inwardly facing, spherically shaped, bearing surfaces 45, of the first and second bearing segments 51 and 53, are fabricated from a woven PTFE fabric, and the outer portions 61 and 65 of the first and second bearings segments 51 and 53 are fabricated from a filament wound fiberglass and epoxy resin matrix and are respectively bonded to the inner parts or portions 63 and 67 providing the inwardly facing spherically shaped bearing surface 45.

Preferably, the outer bearing segments 51 and 53 are filament wound on a tooling ball which is much narrower than the inner race used in the mounted block. This method of manufacturing allows for more units to be wound at one time, allows for less material to be used in the process (less scrap), and eliminates the damaging of the inner race during the cut off process.

The inner rotating sub-assembly 15 includes an inner bearing 71 including an outer surface defined by an outwardly facing, spherically shaped bearing surface 73 engaging the inwardly facing, spherically shaped, bearing surface portions of the first and second outer bearing segments 51 and 53. The inner bearing 71 also includes an internal cylindrical bore 75. In addition, in the disclosed construction, the inner rotating sub-assembly 15 includes an inner sleeve 81 having a cylindrical outer surface 83 received in the internal cylindrical bore 75 of the inner bearing 71, and an internal bore 85 adapted to receive a rotating member 91 fixed to the sleeve 81 for common rotation therewith.

The inner bearing 71 can be fabricated from any suitable material and, in the disclosed construction, is preferably fabricated from steel. Any suitable construction can be employed for the inner sleeve 81 and the rotating member 91. In some constructions, the inner sleeve 81 can be omitted and, in other instances, the inner sleeve 81 can constitute the rotating member 91.

The engagement between the outwardly facing, convexly formed, spherical bearing surface 73 of the inner bearing 71 and the inwardly facing, concavely formed, spherical bearing surface 45 formed by the first and second outer bearing segments 51 and 53 serves to retain the bearing segments 51 and 53 in axially spaced relation to each other and to locate the space 55 for communication with the lubrication conduit 31. In addition, the space 55 is defined, in part, by the outwardly facing, convexly formed, spherical bearing surface 73 and, therefore, the spherical bearing surfaces 45 and 73 receive lubricant from the space 55.

Means are provided for retaining the first and second bearing segments 51 and 53 in spaced relation to each other and against axially outward movement relative to the inner bearing 41 and relative to the pillow block housing 21. While other constructions can be employed, in the disclosed construction, such means comprises the provision, in the pillow block housing 21, adjacent the opposite ends of the cylindrical bore 27 therein, of respective threaded portions 93, and the provision, at each end of the cylindrical bore 27, of respective covers or retainers 95 which are threadedly received by the threaded portions 93. While other constructions can be employed, in the disclosed construction, the covers or retainers 95 comprise annular washers having cylindrical outer edges or edge portions 97 threadedly received in the threaded portions 93 of the pillow block housing 21. In addition the covers, or retainers or washers include respective central bores 99 with diameters less than that of the spherical bearing surface 45 adjacent the outer ends thereof so as to engage the side surfaces of the bearing segments 51 and 53 to prevent axial outward movement thereof. In addition to limiting axial movement of the outer bearing segments 51 and 53, the covers or retainers 95 also serve to enable adjustment for clearance and end play.

The disclosed bearing assembly construction improves reliability, life, and consistency of bearing operation under high loads and small angles of oscillation. In addition, the disclosed bearing assemblies also provide lower friction under boundary lubrication conditions.

The disclosed bearing assembly construction also allows for the use of standard bearing blocks and seals for applications in dusty and dirty environments. In addition, the disclosed bearing assemblies can be run "dry", i.e., without lubrication, if the mating bearing surface engaging the bearing segments 51 and 53 has the proper corrosion protection for the operating conditions. If desired, the life of the disclosed bearing assemblies can be extended by adding lubrication to the gap or space 55 which is located between the bearing segments 51 and 53 and which acts as a reservoir.

The disclosed bearing assembly construction also provides a major advantage in that the disclosed bearing assembly construction, as compared to a rolling element bearing, has the ability to withstand high loads with very small angles of oscillation without fretting, brinelling, spalling, galling, and fatigue of the mating surface.

Various of the features are set forth in the following claims.

We claim:

1. A bearing assembly comprising an outer non-rotating sub-assembly including an outer housing including a cylindrical bore, and an outer bearing including an outer cylindrical surface engaging said cylindrical bore of said outer housing, an outer part fabricated of filament wound fiberglass and epoxy resin matrix, and an inner bearing part fabricated of woven PTFE fabric and including a spherical inwardly facing bearing surface, and an inner movable sub-assembly including an inner bearing including an outer surface defined by a spherical outwardly facing bearing surface engaging said inwardly facing bearing surface of said outer bearing, and an internal cylindrical bore adapted to receive a movable member.

2. A bearing assembly in accordance with claim 1 wherein said outer bearing includes a first bearing segment including a first portion of said cylindrical outer surface of said outer bearing, and a first portion of said spherical inwardly facing bearing surface of said outer bearing, and a second bearing segment located in spaced relation to said first bearing segment and including a second portion of said cylindrical outer surface of said outer bearing, and a second portion of said spherical inwardly facing bearing surface of said outer bearing.

3. A bearing assembly in accordance with claim 2 wherein said first and second bearing segments define therebetween a space extending to said spherical outwardly facing bearing surface of said inner bearing, and wherein said outer housing includes an external surface, and a lubrication conduit communicating between said space and said external surface.

4. A bearing assembly in accordance with claim 1 and further including means for preventing axial movement of said outer bearing relative to said outer housing.

5. A bearing assembly in accordance with claim 1 wherein said cylindrical bore of said outer housing includes an axis, and axially spaced first and seconds ends, and wherein said bearing assembly further includes first and second covers respectively fixed to said outer housing adjacent said first and second ends of said cylindrical bore thereof and in positions to close said cylindrical bore of said outer housing and to prevent axial movement of said outer bearing relative to said outer housing.

6. A bearing assembly in accordance with claim 5 wherein said first and second ends of said cylindrical bore of said outer housing are threaded, and wherein said first and second covers are annular members which are respectively threadedly engaged with said first and second threaded ends of said cylindrical bore of said outer housing.

7. A bearing assembly comprising an outer non-rotating sub-assembly including an outer housing including a cylindrical bore, and an outer bearing including an outer cylindrical surface engaging said cylindrical bore of said outer housing, an outer part fabricated of filament wound fiberglass and epoxy resin matrix, and an inner bearing part fabricated of woven PTFE fabric and including a bore defined by a spherical inwardly facing bearing surface, and an inner rotating sub-assembly including an inner bearing including an outer surface defined by a spherical outwardly facing bearing surface engaging said inwardly facing bearing surface of said outer bearing, and an internal cylindrical bore, and a sleeve including a cylindrical outer surface received in said internal bore of said inner bearing, and an internal bore adapted to receive a rotating member to be fixed thereto for common rotation therewith.

8. A bearing assembly in accordance with claim 7 wherein said outer bearing include s a first bearing segment including a first portion of said cylindrical outer surface of said outer bearing, and a first portion of said spherical inwardly facing bearing surface of said outer bearing, and a second bearing segment located in spaced relation to said first bearing segment and including a second portion of said cylindrical outer surface of said outer bearing, and a second portion of said spherical inwardly facing bearing surface of said outer bearing.

9. A bearing assembly in accordance with claim 8 wherein said first and second bearing segments define therebetween a space extending to said spherical outwardly facing bearing surface of said inner bearing, and wherein said outer housing includes an external surface, and a lubrication conduit communicating between said space and said external surface.

10. A bearing assembly in accordance with claim 7 and further including means for preventing axial movement of said outer bearing relative to said outer housing.

11. A bearing assembly in accordance with claim 7 wherein said cylindrical bore of said outer housing includes an axis, and axially spaced first and seconds ends, and wherein said bearing assembly further includes first and second covers respectively fixed to said outer housing adjacent said first and second ends of said cylindrical bore thereof and in positions to close said cylindrical bore of said outer housing and to prevent axial movement of said outer bearing relative to said outer housing.

12. A bearing assembly in accordance with claim 11 wherein said first and second ends of said cylindrical bore of said outer housing are threaded, and wherein said first and second covers are annular members which are respectively threadedly engaged with said first and second threaded ends of said cylindrical bore of said outer housing.

13. A bearing assembly comprising an outer non-rotating sub-assembly including a pillow block housing including an external surface, a cylindrical bore having an axis, and first and second threaded ends, and a lubrication conduit communicating between said external surface and cylindrical bore, an outer bearing including a first bearing segment including a first cylindrical outer surface engaging said cylindrical bore of said pillow block housing, an outer part fabricated of filament wound fiberglass and epoxy resin matrix, and an inner bearing part fabricated of woven PTFE fabric and including a first inwardly facing spherical bearing surface, and a second bearing segment located in axially spaced relation to said first bearing segment to define therebetween a space communicating with said lubrication conduit in said pillow block housing and including a second cylindrical outer surface of said outer bearing engaging said cylindrical bore of said pillow block housing, an outer part fabricated of filament wound fiberglass and epoxy resin matrix, and an inner bearing part fabricated of woven PTFE fabric and including a second inwardly facing spherical bearing surface, and first and second annular covers respectively threadedly engaged with said first and second threaded ends of said cylindrical bore of said pillow block housing and in positions to close said cylindrical bore of said pillow block housing and to prevent axial movement of said outer bearing relative to said pillow block housing, and an inner rotating sub-assembly including an inner bearing including an outer surface defined by a spherical outwardly facing bearing surface engaging said inwardly facing bearing surfaces of said first and second segments of said outer bearing, and an internal cylindrical bore, and a sleeve including a cylindrical outer surface received in said internal bore of said inner bearing, and an internal bore adapted to receive a rotating member to be fixed thereto for common rotation therewith.

\* \* \* \* \*